United States Patent [19]
Huang

[11] 3,847,237
[45] Nov. 12, 1974

[54] COMPUTING MECHANISM
[76] Inventor: It Bau Huang, No. 199 Chung Shan Rd., Tainan, Taiwan
[22] Filed: Oct. 25, 1973
[21] Appl. No.: 409,627

[52] U.S. Cl. .............................................. 177/25
[51] Int. Cl. .......................................... G01g 23/22
[58] Field of Search....... 177/25, 31, 32; 235/58 PS, 235/61 PS

[56] References Cited
UNITED STATES PATENTS

| 1,284,188 | 11/1918 | Goss et al. | 177/32 X |
| 1,678,181 | 7/1928 | Durgin | 235/58 PS |
| 3,181,633 | 5/1965 | Worst | 177/25 UX |
| 3,513,922 | 5/1970 | Schwarz | 177/25 |

FOREIGN PATENTS OR APPLICATIONS

| 643,889 | 9/1928 | France | 235/58 PS |
| 1,291,752 | 12/1962 | France | 177/25 |

Primary Examiner—George H. Miller, Jr.
Attorney, Agent, or Firm—Victor R. Beckman

[57] ABSTRACT

A computing mechanism which may be used with a weighing device for computing the total value of goods being weighed. The weighing device, which is of generally conventional design, includes a rotatable pointer movable over a suitable semicircular weight scale having uniformly spaced weight graduations. The computing mechanism includes a radially movable price scale with uniformly spaced price graduations. The price scale is of a fixed overall length but has an adjustable radius of curvature about the pivot axis of the rotatable pointer. The "zero" end of the price scale is simultaneously radially and circumferentially movable. A radially extending unit price scale with uniform unit price graduations is provided along which the price scale is radially adjusted to the desired unit price. The movable pointer directly indicates the weight of goods on the weight scale and the total value of the goods on the price scale.

5 Claims, 5 Drawing Figures

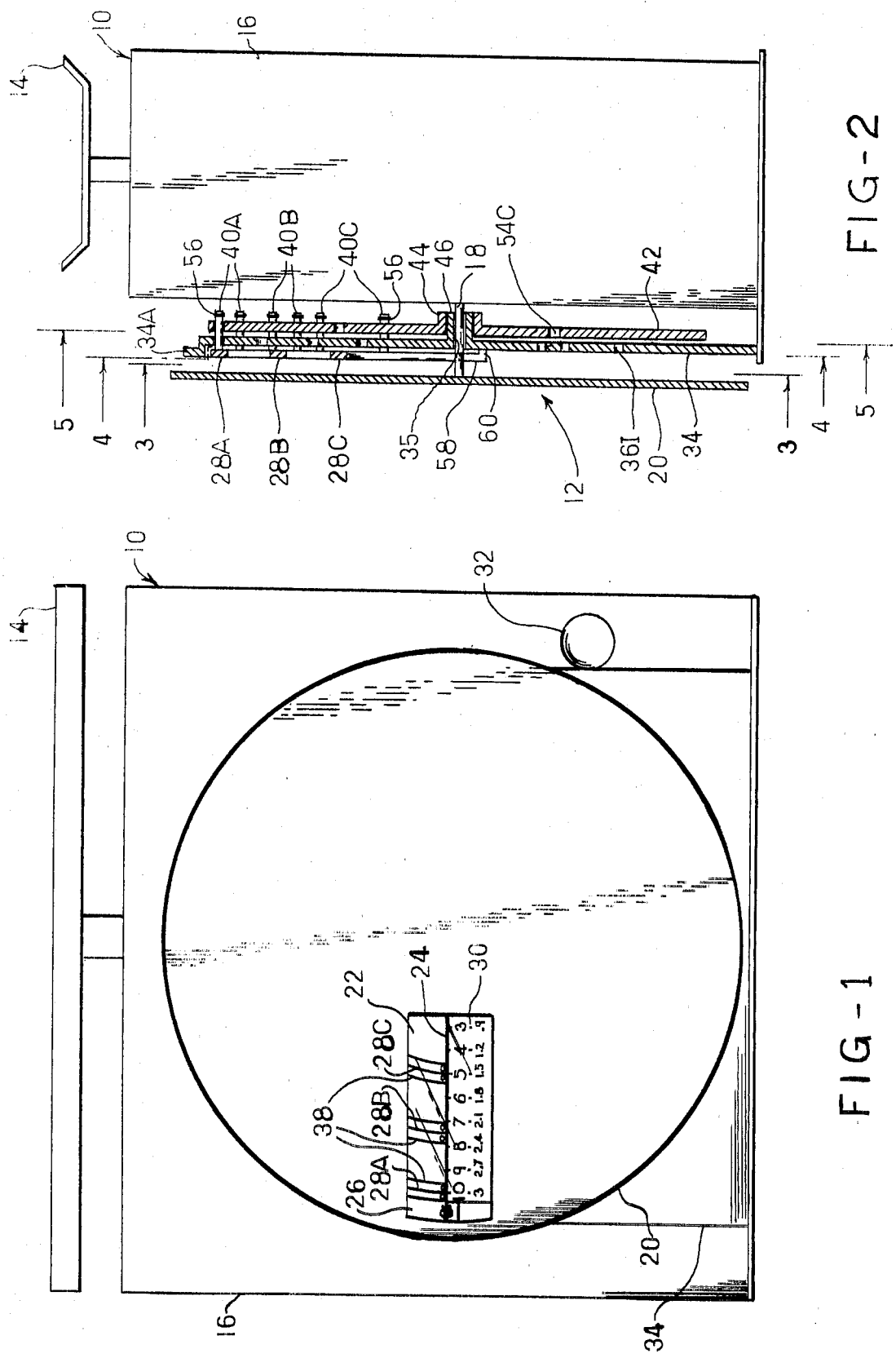

COMPUTING MECHANISM

BACKGROUND OF THE INVENTION

Numerous computing mechanisms including those for use with weighing devices are known. Many such mechanisms include a dial or chart which is substantially covered with numerals making it difficult to determine which numeral is to be read. U.S. Pat. Nos. 679,795 — Thomas, and 1,736,821 — Christopher are representative of such mechanisms. Other such mechanisms may include an easily read price read out, but depend upon complicated electronic or mechanical apparatus as illustrated, for example, in the U.S. Pat. Nos. 2,445,022 — Colman, and 3,513,922 — Schwarz.

SUMMARY OF THE INVENTION

An object of this invention is the provision of an improved and simplified computing mechanism which is particularly adapted for directly indicating the total value of goods being weighed.

An object of this invention is the provision of a computing mechanism for multiplication and/or division operations in which the multiplicand, multiplier, and product scales, or dividend, divisor and quotient scales, each are provided with easily read uniform graduations.

The computing mechanism of this invention includes a fixed arcuate multiplicand (quotient or weight) scale along which a rotatable pointer is movable to a measured or selected multiplicand. The mechanism also includes one or more arcuate, radially movable, product (dividend or total price) scales, and a linear multiplier (divisor or unit price) scale which extends radially of the rotatable pointer and along which the radially movable product scale is moved to the selected multiplier. The pointer indicates both the multiplicand and product on the fixed arcuate multiplicand scale and radially movable product scale respectively. The radially movable product scale is formed of flexible plastic, metal, or like material having a plurality of rearwardly extending pins for the support thereof. The multiplicand scale may be carried on a fixed plastic plate formed with a plurality of curvilinear slots into which the product scale pins extend. A movable drive plastic plate having a plurality of slots formed therein is provided adjacent the fixed slotted plate, through which slots the product scale pins also extend. The pins and attached product scale, are thereby moved radially upon movement of the drive plate for setting the product scale to the desired position along the radially extending multiplier scale. Where the computing mechanism is used with a weighing device, the pointer is movable by the weighing device along a weight scale and the total price scale, and the total price scale is radially adjusted to the desired unit price along the radially extending unit price scale by adjustment of the movable drive plate.

BRIEF DESCRIPTION OF THE DRAWINGS

The above and other objects and advantages of the invention will become apparent from the following description when taken in conjunction with the accompanying drawings. In the drawings, wherein like reference characters refer to the same parts in the several views:

FIG. 1 is a front elevational view of a novel computing mechanism embodying this invention in use with weighing device;

FIG. 2 is a side elevational view of the weighing device but showing the computing mechanism in longitudinal vertical cross-section.

Figure 3:
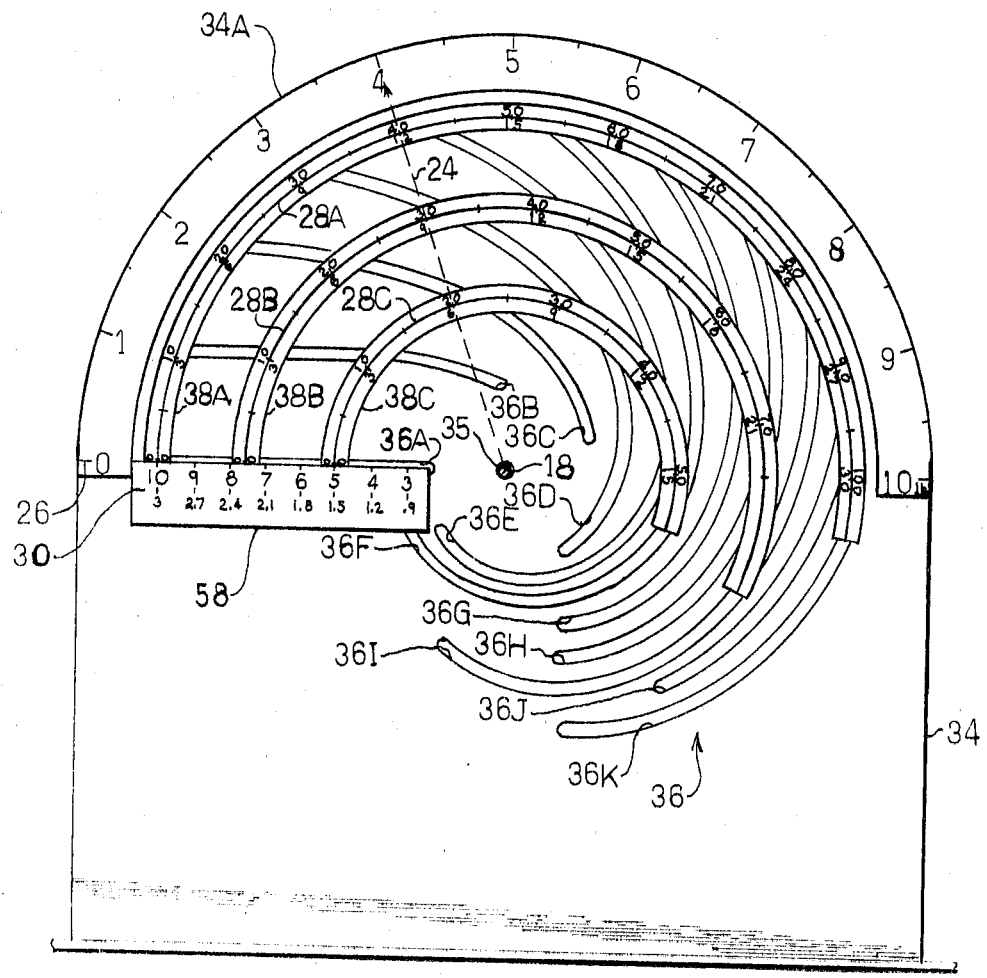
FIGS. 3, 4 and 5 are cross-sectional views taken substantially along lines 3—3, 4—4 and 5—5, respectively, of FIG. 2, and showing the weight scale plate and price scale actuating plate.

Reference first is made to FIGS. 1 and 2 wherein there is shown a weighing device 10 which employs the novel computing device 12 of this invention. The weighing device 10 may be of conventional design and requires no detailed description. The illustrated device is shown comprising a weight pan 14 upon which the article to be weighed may be placed. The weighing mechanism is contained within a housing 16 from the front of which housing extends a rotatable pointer shaft 18 which is rotated in an amount dependent upon the weight of the object on the pan 14. Although the shaft may be provided with a simple pointer I have shown an opaque disk 20 attached thereto which disk is provided with a transparent window 22 as viewed in FIG. 1 upon which a radially extending pointer or index 24 is formed or affixed. Viewable through the window 22 in the FIG. 1 position thereof with no weight on the scale pan is a portion of a semicircular weight scale 26, a portion of three semicircular, radially movable total price scales designated 28A, 28B and 28C, and the entire unit price scale 30. With an object to be weighed in the weight pan 14 the disk 20 is rotatable in a clockwise direction for exposure to view of other portions of the weight and total price scales. A unit price adjusting knob 32 is located at the front of the weighing device for radially positioning the total price scales 28A, 28B and 28C at the desired setting along the unit price scale 30.

Figure 4:
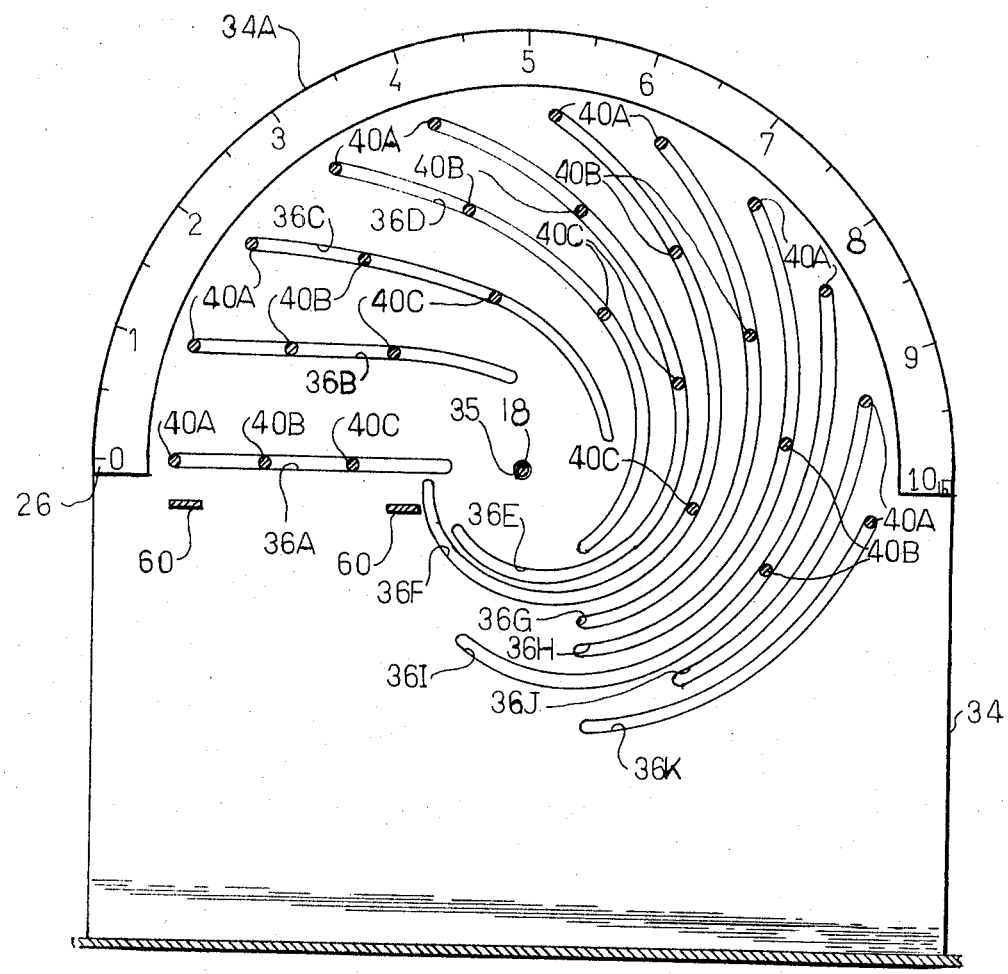

Reference is also made to FIGS. 3 and 4 wherein the weight scale 26 is shown formed along the upper portion 34A of a fixed weight scale plate 34. The upper semicircular portion 34A of the plate upon which the scale 26 is formed is positioned forwardly of the remainder of the plate 34 substantially in alignment with the plane of the total price scales 28A, 28B and 28C. Obviously, the fixed plate portion 34A could be attached to the front of the housing 16 or to some other fixed portion of the device, instead of to the fixed plate 34, if desired.

The fixed plate 34 is provided with a central aperture 35 through which the rotatable pointer shaft extends, and a plurality of slots 36 individually identified by reference characters 36A through 36K. The slots extend along the locii of selected graduation points of the total price scales 28A, 28B and 28C as the radius thereof changes. In the illustrated arrangement the slots extend along the locii of the principal graduation points of 0, 10, 20, . . . and 100. The slot 36A extends radially along the "0" (zero) point of the scales 28A, 28B and 28C whereas the remainder of the slots 36B–36K which extend along the locii of the points 10, 20, 30, . . . and 100 of the total price scales are of spiral shape. The scales 28A, 28B, and 28C, except for length, are uniformly graduated and are located on the face of bands 38 individually identified by reference characters 38A, 38B and 38C, respectively. The bands, which may be of identical construction, except for length, are formed of a flexible material such as plastic, metal, or the like. Supporting pins identified by the reference characters 40A, 40B and 40C extend from the rear of the bands 38A, 38B and 38C, respectively, and into the slots 36. The pins are located at the same graduation points of the scales along which the slots 36 extend which, in the illustrated arrangement include the points 0, 10, 20, . . . and 100.

Figure 5:
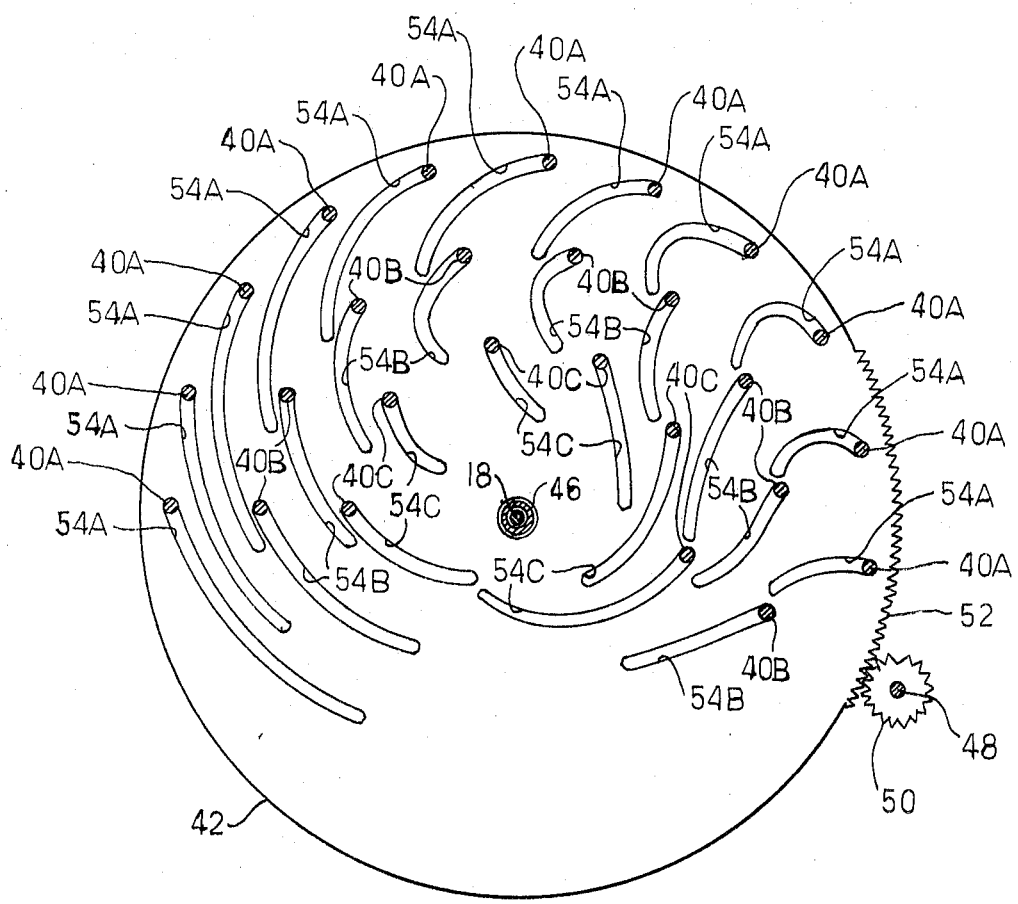

The pins 40A, 40B and 40C are movable along the slots for radial adjustment of the total price scale bands 38A, 38B and 38C. Movement of the pins is under control of a rotatably mounted actuating plate 42. The plate is formed with a central aperture which is flanged as at 44 for rotatable support on a rearwardly extending flange 46 formed at the aperture 35 in the fixed plate 34. Movement of the actuating plate is under control of the unit price adjusting knob 32 (FIG. 1) which is connected by a shaft 48 extending past the fixed plate 34 to a gear 50 which, in turn, engages a gear sector 52 (FIG. 5) at the periphery of the plate. Suitable means, not shown, support the shaft 48.

The actuating plate is formed with a plurality of curvilinear slots 54A, 54B and 54C through which the total price band supporting pins 40A, 40B and 40C, respectively, extend. Lock rings 56 (FIG. 2) may be used at the rear of the pins to prevent disengagement of the pins from the slots. As with the slots in the fixed plate, the slots 54A, 54B and 54C are located along the locii of the same principal graduation points 0, 10, 20, . . . and 100 of the total price scales as the radius of the scales is changed. Because the plate 42 is rotated during such change a different configuration of slots is required. Among other things, the specific configuration of the slots depends upon the amount of rotation of the plate used to effect the required radial change in the total price bands. The pins 40A, 40B and 40C extend through the intersection of the slots in the fixed and movable plates and are driven therealong as the movable plate 42 is rotated upon rotation of the knob 32. In the illustrated arrangement wherein a plurality of total price bands are used the bands are movable along separate portions of the unit price scale 30. In the exemplary arrangement wherein three total price bands 38A, 38B and 38C are employed each band is movable along one-third of the length of the unit price scale. It will here be noted that the invention is not limited to the use of three total price bands; one or more bands are sufficient. If a single total price band was employed the slots 54A, 54B and 54C in the movable plate would be of such a configuration to move the band along the entire length of the unit price scale 30. By using a plurality of total price bands 38 the required change in radius for each band is less than that which would be required of a single band movable over the same length of unit price scale.

The unit price scale 30 is formed or located on a unit price scale plate 58 secured to the fixed plate 34 as by brackets or arms 60. The plate 58 is located directly beneath the radially movable zero "0" ends of the total price scales 38A, 38B and 38C whereby the movable scales may be accurately located at any desired position therealong. The unit price scale 30 formed on the plate 58 is provided with uniform graduations, with the distance from the axis of the pointer shaft 18 being directly related to the unit price. In the exemplary arrangement the graduations of the unit price are used to designate two different unit price ranges, with one range extending between 0.9 and 3 and another between 3 and 10 for a total range of from 0.9 to 10. Similarly, the graduations of the total price scales are provided with separate total price ranges which, on the outer-most band 38A extend between 0–30 and 0–100 for use with the corresponding unit price scale portions. For easy identification the different ranges may be printed in different color. For example, all of the lower-most ranges may be in black while the upper-most ranges may be red.

In the operation of the device, with no weight on the weight pan 14, the total price bands 38 are radially adjusted by use of the knob 32 to the required unit price for the particular goods to be weighed. The actual unit price of the goods determines which range of the unit price scale 30, which total price band 38 and which scale range on the band is employed. In the position illustrated in the drawings the bands are set for unit prices of 10, 7.5 and 5 along the upper portion of the scale range, and for unit prices of 3, 2.25 and 1.5 along the lower portion of the scale range. With the bands 38 set for the proper unit price, the goods to be weighed are placed on the weight pan 14 whereupon the dial 20 with affixed pointer 24 is rotated to a position where the weight is directly indicated on the weight scale 26 and the price is directly indicated on the selected total price scale on one of the bands 38.

Assume that goods having a weight of 4 pounds are placed on the weight pan such that the pointer 24 is rotated to the 4 pound position as shown in phantom line in FIG. 3. At the illustrated position of the total price bands along the unit price scale 30 the total prices of 40 and 12, 30 and 9, and 20 and 6 are indicated by the pointer position along the total price scales 28A, 28B 28C, respectively. The operator, having set the total price scale band to the required unit price on the unit price scale 30, will experience no difficulty in remembering which total price scale is to be read.

The invention having been described in detail in accordance with the requirements of the Patent Statutes, various changes and modifications will suggest themselves to those skilled in this art. For example, as noted above, the computing mechanism may be constructed with one or more radially movable total price bands and is not limited to the illustrated three bands. Also, additional graduations may be included on the unit and total price scales to facilitate reading thereof. Furthermore, the upper and lower scale ranges need not employ the same graduations. For example, the lower unit price scale could be graduated in units of 1, 1.5, 2, 2.5 and 3, if desired, which graduations could be in the same color as the corresponding scale numerals. Obviously, the invention is useable with weighing mechanisms having different total weight capacities than the illustrated 10 pound capacity. Also, other units including different weight and price units may be used for use with other currency and weight systems. In addition, as mentioned above the computing mechanism of this invention is useable entirely independently of any weighing system for performing multiplication and division operations. For example, the invention may be employed in a calculator with uniform graduations (as distinguished from conventional slide rules having logarithmic scales). Additionally, the mechanism may be in other instruments having a single movable pointer for indicating two different quantities; one at the fixed scale and the other at the radially movable scale. For example, the mechanism may be employed in a combination volt (or ammeter) and watt meter for indicating voltage (or current) and power at the fixed and movable scales. Also, the invention is not limited to the illustrated rotational movement of the movable plate, since linear, curvilinear, translational or combinations of movements is possible for effecting the desired radial change of the total price scales.

It is intended that the above and other such changes and modifications shall fall within the spirit and scope of the invention as defined in the appended claims.

I claim:

1. A computing mechanism for performing multiplication operations comprising, pointer means rotatably mounted about an axis of rotation, a curvilinear multiplicand scale having a center of curvature at the axis of rotation of the pointer means along which scale the pointer is movable, a radially movable product scale having a center of curvature at the axis of rotation, and means for radially moving the radially movable product scale in accordance with a selected multiplier, the product of the multiplicand indicated on the curvilinear multiplicand scale by the pointer means and the selected multiplier being indicated by the pointer means on the radially movable product scale, a linear multiplier scale extending radially from the axis of rotation and along which said radially movable product scale is movable to the selected multiplier, a weighing mechanism attached to the pointer for rotation of the pointer in an amount dependent upon the weight of an object being weighed, said curvilinear multiplicand scale having graduations in units of weight, said linear multiplier scale having graduations in units of price per unit weight, and said radially movable product scale having graduations in units of price.

2. The computing mechanism as defined in claim 1 wherein said linear multiplier scale includes two scale ranges of unit price, and said radially movable product scale includes two scale ranges of price for use in conjunction with said respective unit price scale ranges.

3. A price calculating means for use with a weighing device which includes a pointer rotatable in an amount determined by the weight of an object being weighed, and an arcuate weight scale over which the pointer is movable to indicate the weight of the object being weighed, said price calculating means including a radially movable arcuate total price scale coaxial with said weight scale over which said pointer also is movable to indicate price of the object being weighed, and means for radially positioning said total price scale at a radial distance from the axis of rotation of said pointer which is directly indicative of the unit price of the object being weighed.

4. The price calculating means as defined in claim 3 including a linear unit price scale extending radially of the axis of rotation of said pointer, and said arcuate total price scale being radially adjusted along said linear unit price scale.

5. The price calculating means as defined in claim 4 wherein said means for radially positioning said arcuate total price scale includes, a flexible band upon which the total price scale is formed, a plurality of pins extending from the rear of said band, a fixed plate having a plurality of spiral slots therein with the center of the spirals at the axis of rotation of said pointer, a movable plate adjacent said fixed plate and mounted for rotative movement about the axis of rotation of said pointer, said movable plate being formed with a plurality of curvilinear slots therein which intersect said slots in said fixed plate, said pins extending through the intersections of the slots for movement of the pins along the slots with rotary motion of the movable plate to thereby adjust the radial position of said flexible band.

* * * * *